(12) United States Patent
Kuramoto et al.

(10) Patent No.: US 11,372,700 B1
(45) Date of Patent: Jun. 28, 2022

(54) FAULT-TOLERANT DATA TRANSFER BETWEEN INTEGRATED CIRCUITS

(71) Applicant: Xilinx, Inc., San Jose, CA (US)

(72) Inventors: Randal M. Kuramoto, San Carlos, CA (US); James S. Devereaux, Placentia, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 17/115,524

(22) Filed: Dec. 8, 2020

(51) Int. Cl.
*G06F 11/07* (2006.01)
*G06F 11/10* (2006.01)
*G06F 12/0802* (2016.01)

(52) U.S. Cl.
CPC .......... *G06F 11/073* (2013.01); *G06F 11/106* (2013.01); *G06F 12/0802* (2013.01)

(58) Field of Classification Search
CPC ... G06F 11/073; G06F 11/106; G06F 12/0802
See application file for complete search history.

(56) References Cited

U.S. PATENT DOCUMENTS

| | | | |
|---|---|---|---|
| 6,986,078 B2 | 1/2006 | Rodbell et al. |
| 7,036,059 B1 | 4/2006 | Carmichael |
| 7,249,010 B1 | 7/2007 | Sundararajan |
| 7,310,759 B1 | 12/2007 | Carmichael |
| 7,383,479 B1 | 6/2008 | Carmichael |
| 7,512,871 B1 | 3/2009 | Carmichael |
| 7,620,883 B1 | 11/2009 | Carmichael |
| 7,937,679 B2 | 5/2011 | Mariani |
| 8,065,644 B1 | 11/2011 | Jacobson |
| 8,375,338 B1 | 2/2013 | Hussein et al. |
| 8,407,653 B1 | 3/2013 | Schumacher |
| 8,504,974 B1 | 8/2013 | Trimberger |
| 8,661,382 B2 | 2/2014 | Lamb |
| 8,813,013 B2 | 8/2014 | Titley |
| 9,047,429 B2 | 6/2015 | He |

(Continued)

OTHER PUBLICATIONS

Jing et al., "Quantitative SEU Fault Evaluation for SRAM-Based FPGA Architectures and Synthesis Algorithms," 2011 IEEE 21 st Int'l Conference on Field Programmable Logic and Applications, pp. 282-285.

(Continued)

*Primary Examiner* — Thien Nguyen
(74) *Attorney, Agent, or Firm* — Kevin T. Cuenot

(57) ABSTRACT

A system can include a plurality of memory devices, wherein the plurality of memory devices includes at least three memory devices. The system can include an IC. The IC can include a memory controller coupled to each of the plurality of memory devices in parallel, wherein the memory controller is configured to broadcast a read command to each of the plurality of memory devices. The IC can include an error correction circuit coupled to each of the plurality of memory devices, wherein the error correction circuit is configured to compare data bits received from the plurality of memory devices responsive to the read command and output data bits corresponding to a majority of the data bits received from the plurality of memory devices. The IC can include a consumer circuit coupled to the error correction circuit, wherein the consumer circuit receives the data bits output from the error correction circuit.

11 Claims, 6 Drawing Sheets

(56) References Cited

U.S. PATENT DOCUMENTS

| | | | |
|---|---|---|---|
| 9,483,599 | B1 | 11/2016 | Jain et al. |
| 9,484,919 | B1 | 11/2016 | Jain et al. |
| 2004/0187050 | A1 | 9/2004 | Baumann et al. |
| 2004/0230935 | A1 | 11/2004 | Samudrala et al. |
| 2014/0089561 | A1 | 3/2014 | Pangal |
| 2014/0173548 | A1 | 6/2014 | Greb et al. |
| 2016/0049941 | A1 | 2/2016 | How |
| 2016/0217035 | A1* | 7/2016 | Chen .................. G11C 16/3418 |
| 2018/0122477 | A1* | 5/2018 | Kajigaya ............. G11C 11/1677 |
| 2018/0205396 | A1* | 7/2018 | Ikegawa ............. G06F 11/1068 |
| 2020/0174883 | A1* | 6/2020 | Chih .................. H03M 13/2906 |
| 2020/0321979 | A1* | 10/2020 | Criss ................. H03M 13/2942 |

OTHER PUBLICATIONS

Zhong ming et al., "A software solution to estimate the SEU-induced soft error rate for systems implemented on SRAM-based FPGAs," Journal of Semiconductors, vol. 32, No. 5, May 2011, 7 pages.

Sundararajan et al., "estimation of Single Event Upset Probability Impact of FPGA Designs," 2003 Proc. of 6th Annual Int'l Conference on <ilitary and Aerospace Programmable Logic Devices, 4 pages.

Srinavasan et al., "Improving Soft-error Tolerance of FPGA Configuration Bits," 2004 IEEE, pp. 107-110.

Kaul et al., "Simulation of SEU Transients in CMOS I Cs," IEEE Trans, on Nuclear Science, vol. 38, No. 6, Dec. 1991, pp. 1514-1520.

Reorda et al., "Efficient Estimation of SEU effects in SRAM-based FPGAs," 2005 Proc, of the 11th Int'l On-Line Testing Symposium, 6 pages.

Sari et al., "Scrubbing-based SEU Mitigation Approach for Systems-on-Prgrammable-Chips," 2011 IEEE, 8 pages.

Maniatakos et al., "Investigating the Limits of AVF Analysis in the Presence of Multiple Bit Errors," 2013 IEEE 19th Int'l On-Line Testing Symposium, pp. 49-54.

Graham et al., Consequences and Categories of SRAM FPGA Configuration SEUs, 2003 Military and Aerospace Programmable Logic Devices Int'l Conference, pp. 1-9.

Asadi et al., "Soft Error rate Estimation and Litigation for SRAM-Based FPGAs," 2005 ACM, pp. 149-160.

Pratt, Brian et al., "Fine-Grain SEU Mitigation for FPGAs Using Partial TMR," IEEE Transactions on Nuclear Science, Aug. 2008, pp. 2274-2280, vol. 55, No. 4, IEEE, Piscataway, New Jersey, USA.

Xilinx, Inc., LogiCORE IP Soft Error Mitigation Controller v4.1 Product Guide, PG036, Apr. 2, 2014, pp. 1-118, Xilinx, Inc., San Jose, California, USA.

"SEU Mitigation for Sram-Based FPGAs through Dynamic Partial Reconfiguration", by Cristiana Bolchini, Davide Quarta, Marco D. Santambrogio, GLSVLSI'07, Mar. 11-13, 2007, @2007 ACM.

"Designing Single Event Upset Mitigation Techniques For Large SRAM-based FPGA Devices", Thesis proposal by Fernanda Gusmao de Lima, Feb. 11, 2002.

* cited by examiner

FAULT-TOLERANT DATA TRANSFER BETWEEN INTEGRATED CIRCUITS

TECHNICAL FIELD

This disclosure relates to integrated circuits (ICs) and, more particularly, to fault-tolerance in ICs and to fault tolerant data transfer between multiple ICs.

BACKGROUND

In certain operating environments such as high altitudes and space, circuitry within integrated circuits (ICs) may be vulnerable to faults induced by radiation. As an example, radiation may induce data errors in bi-stable circuits such as flip-flops and/or latches. The collision of certain particles, e.g., neutrons, with an IC may induce a current pulse in the IC that may upset a circuit implemented therein. In the case of a memory circuit such as a flip-flop and/or a latch, a bit may be flipped from 0 to 1 or from 1 to 0 thereby introducing an error into the circuit. These bit errors are referred to as single event upsets (SEUs) or soft errors.

ICs are increasingly vulnerable to SEUs given the continued reduction in device geometry size over time. Since electronic systems routinely include multiple, interconnected ICs exchanging data, an SEU induced in any one of the ICs may cause a serious fault within that IC and/or in the larger electronic system. As such, mitigation of SEUs is an important aspect of electronic design.

SUMMARY

In one aspect, a system can include a plurality of memory devices, wherein the plurality of memory devices includes at least three memory devices. The system can include an integrated circuit (IC). The IC can include a memory controller coupled to each of the plurality of memory devices in parallel, wherein the memory controller is configured to broadcast a read command to each of the plurality of memory devices. The IC can include an error correction circuit coupled to each of the plurality of memory devices, wherein the error correction circuit is configured to compare data bits received from the plurality of memory devices responsive to the read command and output data bits corresponding to a majority of the data bits received from the plurality of memory devices. The IC can include a consumer circuit coupled to the error correction circuit, wherein the consumer circuit receives the data bits output from the error correction circuit.

In another aspect, a system can include one or more memory devices and an IC. The IC can include a memory controller coupled to the one or more memory devices. The IC can include an error coding circuit coupled to the memory controller and the one or more memory devices. The error coding circuit can be configured to generate error correction codes for data written to the one or more memory devices by the memory controller and provide the error correction codes to the one or more memory devices for storage therein with the data. The data and the error correction codes are stored in the one or more memory devices responsive to write commands from the memory controller. The IC can include an error correction circuit coupled to the one or more memory devices, wherein the error correction circuit is configured to receive data and corresponding error correction codes read from the one or more memory devices. The data and the error correction codes read from the one or more memory devices are received in response to read commands provided to the one or more memory devices from the memory controller. The error correction circuit can be configured to detect and correct errors in the data read from the one or more memory devices based on the error correction codes read from the one or more memory devices. The IC can include a consumer circuit coupled to the error correction circuit, wherein the consumer circuit receives corrected data output from the error correction circuit.

In another aspect, a system can include a memory device configured to store data and error correction codes for the data. The system also includes an IC. The IC can include a memory controller coupled to the memory device and an on-chip memory. The IC can include a consumer circuit coupled to the memory device, wherein the consumer circuit is configured to receive, from the memory device, the data and the error correction codes corresponding to the data responsive to read commands provided to the memory device from the memory controller. The consumer circuit stores the data and the error correction codes in the on-chip memory. The IC can include a post-error correction circuit configured to scan the data and the error correction codes stored in the on-chip memory and correct bit errors in the data stored in the on-chip memory based on the error correction codes stored in the on-chip memory.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

This disclosure relates to integrated circuits (ICs) and, more particularly, to fault-tolerance in ICs and to fault tolerant data transfer between multiple ICs within an electronic system. Reliable operation of an electronic system requires that the IC(s) included in that system operate in a fault tolerant manner. To the extent the electronic system includes multiple ICs in communication with one another, the ICs must not only be fault tolerant on an individual basis, but also be capable of transferring data with other ICs of the system in a fault tolerant manner.

The data transferred from a source IC to a destination IC within an electronic system may be utilized by the destination IC for any of a variety of different purposes. In some cases, the destination IC processes the received data as part of normal runtime operations. For example, the destination IC performs one or more particular functions in the electronic system and, in implementing those functions, operates on the data received from the source IC.

In other cases, the data transferred to the destination IC is configuration data intended to configure one or more aspects of the destination IC. For example, a variety of different types of ICs require some amount of configuration. For instance, whether the IC is a programmable IC that includes at least some programmable circuitry such as programmable logic, a processor capable of executing program code, an Application Specific Integrated Circuit (ASIC), a System-on-Chip (SoC), or other type of IC, such an IC often includes configuration memory that must be loaded with configuration data for the IC to function as intended within the electronic system.

Within this disclosure, the term "configuration memory" means memory of an IC that is loaded with configuration data to implement circuits, e.g., custom circuits, in programmable circuitry (e.g., which may include programmable logic) of the IC and/or memory such as one or more registers that may be programmed with configuration data to control the functionality of circuits of the IC including hardwired circuits of the IC. Whether the data provided to a destination IC is used at runtime of the IC or for configuration purposes, reliable transfer of data to the destination IC and/or fault tolerance in the destination IC itself helps to ensure proper operation of the electronic system.

Figure 1:
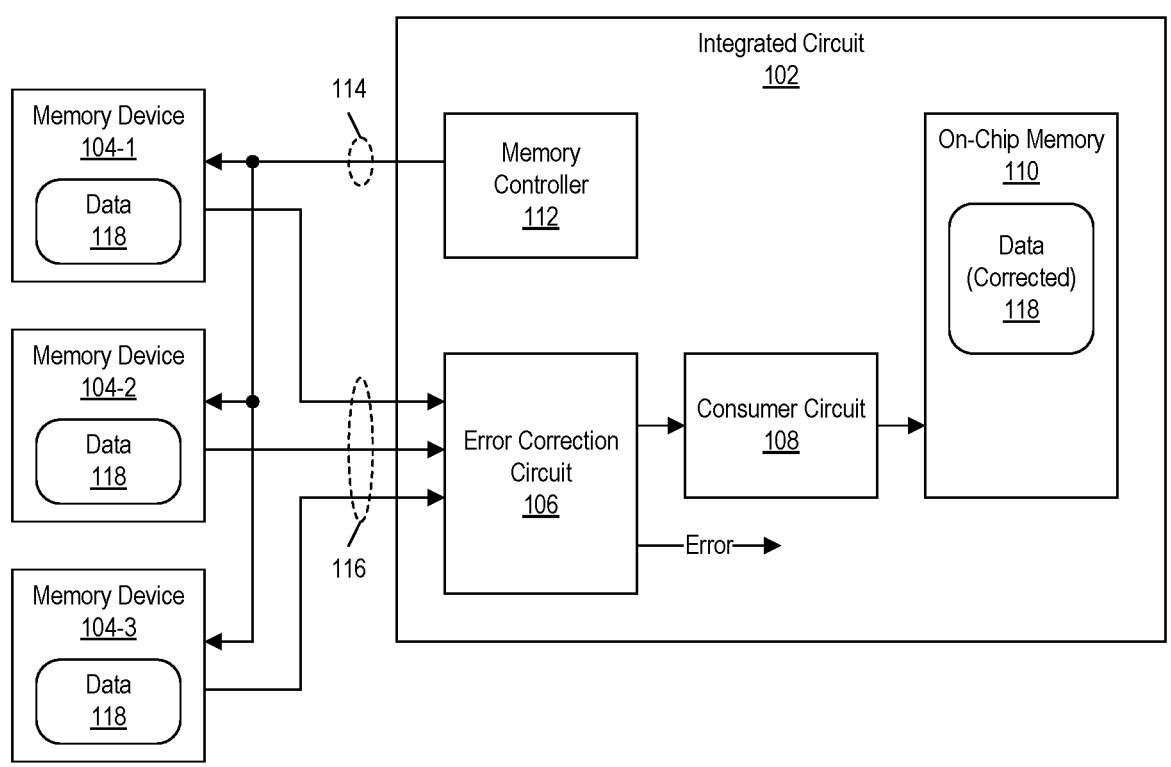
FIG. 1 is an example of an electronic system including error correction circuitry supporting fault tolerant operation.

FIG. 1 is an example of an electronic system (system) 100. In the example of FIG. 1, system 100 includes multiple ICs including IC 102, memory device 104-1, memory device 104-2, and memory device 104-3. In the example of FIG. 1, IC 102 and memory devices 104-1, 104-2, and 104-3 are implemented as separate and distinct ICs. In one aspect, IC 102 and memory devices 104 may be disposed on a same circuit board, where system 100 is a larger electronic system including such circuit board. IC 102 may be connected to memory devices 104 by wires or traces. For example, system 100 may be a computer in which the circuit board on which IC 102 and memory devices 104 are disposed is a "card." As an example, IC 102 and memory devices 104 may implement, or be part of, a hardware acceleration card or other subsystem within system 100. Still, system 100 may be any of a variety of systems such as a navigation system, an entertainment system, or the like.

Within this disclosure, the term "signals" is used to refer to communications conveyed between circuit blocks and/or ICs by wires, traces, or other physical conductive paths. The communications may be single-bit or multi-bit. The communications may be bi-directional. Arrows, for example, illustrate the general direction of data flow and/or control between circuit blocks and/or ICs. An arrow representing data flow in one direction, for example, may represent data flowing in the indicated direction and also may represent data flowing in the reverse direction to effectuate a handshake, an acknowledgement, or the like. As an example, the term "signal" or "signals" may represent a communication channel, data bus, or a control bus.

In the example, IC 102 is capable of reading data from, and writing data to, memory devices 104. In one aspect, data 118, which is stored in memory devices 104 and to be transferred to IC 102, is runtime data. As defined within this disclosure, the term "runtime data" means data that is operated on by IC 102 during runtime of IC 102. The term "runtime" means that IC 102 has completed a power on and/or boot process. Further, to the extent that IC 102 requires the loading of any configuration data, the term "runtime" means that IC 102 has completed the loading of any such configuration data that may be necessary for IC 102 to operate as intended within system 100.

In another aspect, data 118, as stored in memory devices 104, is configuration data to be loaded into IC 102. As defined within this disclosure, the term "configuration data" means data that is loaded into an IC such as IC 102 that configures or programs one or more circuit elements within the IC to perform a particular function and/or operate in a particular mode.

IC 102 may be implemented as any of a variety of different types of ICs as previously discussed. In one aspect, IC 102 is a programmable IC. Examples of programmable ICs include, but are not limited to, Field Programmable Gate Arrays (FPGAs), SoCs, ASICs, graphics processing units (GPUs), other ICs that include at least some programmable circuitry, and/or ICs that include programmable registers. IC 102 includes an error correction circuit 106, a consumer circuit 108, an on-chip memory 110, and a memory controller 112. Memory controller 112 may be coupled to one or more other circuit blocks of IC 102 not shown in the example of FIG. 1. In an example implementation, one or more of the circuit blocks shown in IC 102 may be implemented as hardwired circuit blocks. In another example implementation, one or more of the circuit blocks shown in IC 102 may be implemented as soft-circuit blocks.

In one aspect, memory devices 104 may be implemented as volatile memory devices such as random-access memory (RAM) devices. For example, in the case where data 118 is runtime data, memory devices 104 may be implemented as RAM devices. In another aspect, memory devices 104 may be implemented as non-volatile memory devices. Examples of non-volatile memory devices include flash memories. Each of memory devices 104, for example, may be implemented as a NOR flash memory device having a Serial Peripheral Interface (SPI). Memory devices 104 may be implemented as non-volatile memory devices to store runtime data or configuration data.

Whereas the example of FIG. 1 includes three memory devices 104-1, 104-2, and 104-3, it should be appreciated that more than three memory devices may be included. In cases where more than three memory devices are included in system 100 and coupled to IC 102 as shown, the number of memory devices used may be odd to support operation of error correction circuit 106 and the voter circuitry described hereinbelow in greater detail (e.g., to avoid ties).

As illustrated, memory controller 112 is connected to each of memory devices 104. For example, memory controller 112 is connected to each of memory devices 104 via signals 114. Similarly, error correction circuit 106 is connected to each of memory devices 104. For example, error correction circuit 106 is connected to each of memory devices 104 via signals 116. Using signals 114, memory controller 112 is capable of sending the same commands to each of memory devices 104 concurrently and in parallel. Also using signals 114, memory controller 112 is capable of sending the same data to each of memory devices 104 concurrently and in parallel. For example, memory controller 112 is capable of broadcasting both commands and/or data to memory devices 104 over signals 114. The commands may include read commands, write commands, or both read and write commands. As such, memory controller 112 is capable of storing the data, e.g., data 118, in memory device 104-1 and storing redundant copies of such data in each of memory devices 104-2 and 104-3 by broadcasting the write commands and data 118 to each of memory devices 104 via signals 114. By broadcasting the same write command to each of memory devices 104, the same portion of data is stored at the same address in each of memory devices 104-1, 104-2, and 104-3. The data may be runtime data or configuration data. Configuration data, for example, may be provided from another system or device to IC 102 for storage in memory devices 104.

In response to memory controller 112 sending, e.g., broadcasting, a read command to each of memory devices 104, each of memory devices 104-1, 104-2, and 104-3 ideally returns the same data 118. Data read from memory devices 104 is provided to error correction circuit 106 via signals 116. The data read from memory devices 104 responsive to read commands from memory controller 112 may be provided to error correction circuit 106 in a synchronized manner. Error correction circuit 106 is capable of generating and outputting data that reflects the majority of the received data from memory devices 104-1, 104-2, and 104-3. That is, error correction circuit 106 is capable of comparing the data received in response to a given read command from each of memory devices 104-1, 104-2, and 104-3 on a bit-by-bit basis and outputting bit values reflecting the majority bit values.

As an illustrative and non-limiting example, error correction circuit 106 may receive a portion of data 118 from each of memory devices 104-1, 104-2, and 104-3 in response to an issued read command. The data received from each of memory devices 104-1, 104-2, and 104-3, having been read from the same location in each respective memory in response to the same read command being broadcast to each memory device 104, should be the same, e.g., match. Accordingly, consider the case where, in response to a particular read command broadcast to each memory device, memory 104-1 returns a 1 bit, memory 104-2 returns a 1 bit, and memory 104-3 returns a 0 bit. Appreciably, each memory may return more than 1 bit of data, though 1 bit is used for purposes of illustration. In that case, error correction circuit 106 outputs the majority bit value of 1. In one aspect, error correction circuit 106 implements voter circuitry where individual bit errors may be removed from the received data. Corrupted data from one of the memory devices 104 may be corrected by outputting the majority bit values. In this regard, data output from error correction circuit 106 is effectively corrected data.

Error correction circuit 106 outputs the data, which may include corrected data with one or more bit errors having been corrected therein, to consumer circuit 108. Consumer circuit 108 may be any of a variety of different circuits intended to perform one or more functions using data output from error correction circuit 106. For example, consumer circuit 108 may be a compute unit, a processor, a signal processor, or the like where data 118 is runtime data. Consumer circuit 108 may also store data 118, or a corrected version thereof, as received from error correction circuit 106, within on-chip memory 110.

In another aspect, consumer circuit 108 implements an internal configuration access port (ICAP). The ICAP may be connected to on-chip memory 110, which may be implemented as a configuration memory of IC 102. Thus, consumer circuit 108 is capable of writing the data output from error correction circuit 106 to on-chip memory 110 to configure one or more circuit elements of IC 102.

In cases where error correction circuit 106 detects that one of the inputs from memory devices 104 does not match the other two inputs, error correction circuit 106 also is capable of outputting or asserting an error signal indicating the occurrence of an error. Referring to the prior example where bits [1, 1, 0] are received from memory devices 104-1, 104-2, and 104-3, respectively, error correction circuit 106 may assert the error signal. In another aspect, the error signal may indicate the particular one of memory devices 104 from which the bit error was received or detected. In this example, the error signal that is output may specify that an error occurred and/or that the error was detected in data received from memory device 104-3. In one aspect, the assertion of the error signal may be correlated with the particular read command and address specified by the read command responsible for retrieving the portion of data including the bit error from memory devices 104 so that the location or address of the bit error within the particular memory device (e.g., memory device 104-3 in this example) is determined.

In an example implementation, error correction circuit 106, consumer circuit 108, on-chip memory 110, and memory controller 112 may be implemented within IC 102 as hardwired circuit blocks.

In another example implementation, error correction circuit 106 may be implemented as a soft-circuit block implemented in programmable circuitry of IC 102. In the case where error correction circuit 106 is implemented in programmable circuitry, a multi-stage configuration process for IC 102 may be used. During a first stage of the multi-stage configuration (e.g., boot) process, error correction circuit 106 is implemented by loading first configuration data into IC 102. The first configuration data, which may be limited to implementing only error correction circuit 106 in IC 102, establishing connections between error correction circuit 106 and input/output (I/O) pins of IC 102 (e.g., an I/O port of IC 102), and establishing connections between error correction circuit 106 and consumer circuit 108, may be small in size thereby limiting the likelihood that an error in the first configuration data occurs. The first configuration data may be a portion, e.g., a small portion, of data 118.

For example, the first configuration data may be loaded into IC 102 via one or more I/O pins that are, at least initially, connected to consumer circuit 108 (e.g., an ICAP). Consumer circuit 108 is capable of storing the first configuration data in on-chip memory 110 (e.g., configuration memory). In an example, the first configuration data may be a partial configuration bitstream. In that case, the first configuration data may be obtained from a selected one of the memory devices 104 used as the default memory device. The first configuration data is loaded into on-chip memory 110 to implement error correction circuit 106 based on the assumption that the small amount of configuration data needed to do so is likely error free.

Having loaded the first configuration data into IC 102, error correction circuit 106 is physically implemented in IC 102 and operational. Error correction circuit 106 is inserted between the I/O pins and consumer circuit 108, being connected to each. Once error correction circuit 106 is implemented using programmable circuitry and is operational, further configuration data may be loaded into IC 102. That is, further configuration data may be loaded into IC 102 via the I/O pins subsequent to the first configuration data. The further configuration data may be portions of data 118 other than the first configuration data. The further configuration data may be processed through error correction circuit 106 as previously described herein and provided to consumer circuit 108. Consumer circuit 108 may write the further configuration data, as output from error correction circuit 106, to on-chip memory 110. The further configuration data may be larger in quantity or size than the first configuration data and used to implement other circuits within programmable circuitry of IC 102, configure one or more hardwired circuit blocks of IC 102, or a combination thereof. For example, the further configuration data may implement user-specified circuitry within IC 102. The further configuration data may implement the circuitry that is used during runtime of IC 102.

In the case of a programmable IC, proper configuration of the IC depends on reliable, error-free configuration data. In this regard, programmable ICs operating in high-altitude and/or space environments are at increased risk of data errors due to increased radiation and the potential effects of radiation on electronic circuits. The example circuit architectures and techniques described herein allow IC 102 to receive data within the IC and correct the data within the IC prior to use by consumer circuit 108 and/or on-chip memory 110. As such, IC 102 is capable of tolerating external memory faults and/or the transfer of data including faults thereby improving the reliability of IC 102 whether during runtime or with respect to the configuration process. This, in turn, reduces the downtime of IC 102 and/or system 100. In some cases, use of the example circuit architecture and/or techniques described herein reduces the cost of implementing a system such as system 100 in that other fault mitigation techniques such as using specialized or customized memory devices may be avoided.

In one aspect, consumer circuit 108 may include additional logic that is capable of detecting an error in the first configuration data. In response to detecting such an error in the first configuration data, the logic may instruct memory controller 112 (via a connection not illustrated in FIG. 1) to retry loading a secondary copy of the first configuration data from a different memory location and/or memory device.

Figure 2:
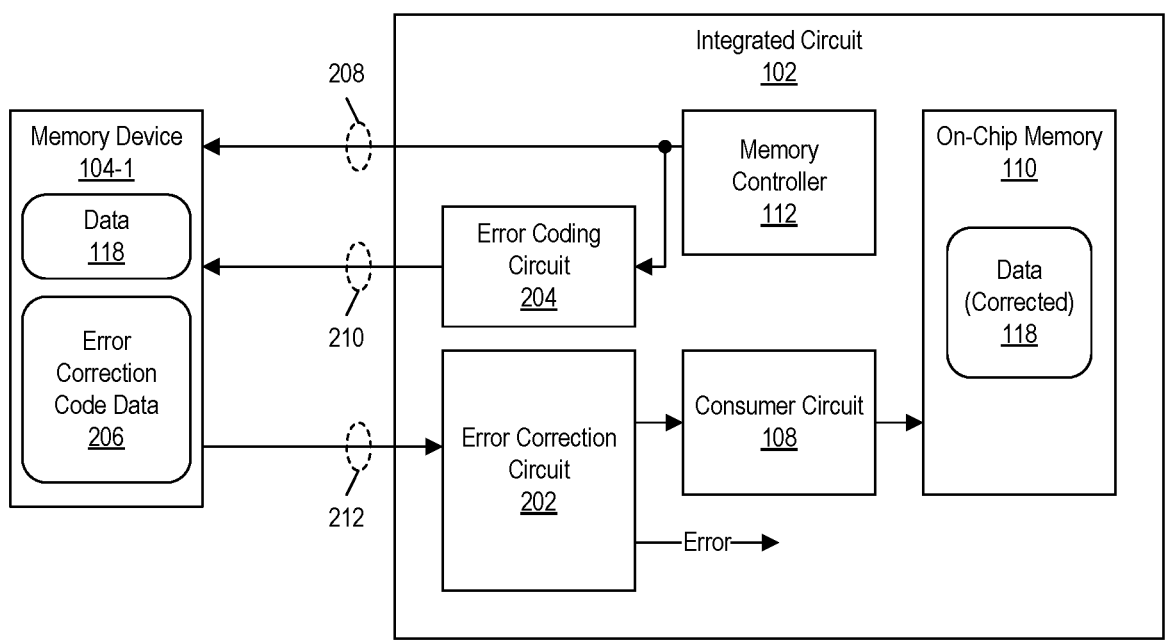
FIG. 2 is another example of an electronic system including error correction circuitry supporting fault tolerant operation.

FIG. 2 is another example of system 100. In the example of FIG. 2, system 100 includes IC 102 and one memory device shown as memory device 104-1. Like the example of FIG. 1, memory device 104-1 is separate and distinct from IC 102. Further distinctions between the example of FIG. 1 and the example of FIG. 2 are described below.

IC 102 includes error correction circuit 202, consumer circuit 108, on-chip memory 110, and memory controller 112. IC 102 also includes an error coding circuit 204. Error coding circuit 204 receives data 118 that is output from memory controller 112 for storage in memory device 104-1 and generates error correction code (ECC) data 206 for data 118. For example, error coding circuit 204 may generate ECCs for data that are output as ECC data 206. ECCs are data that may be decoded to recover the original data used to generate the ECCs even in cases where one or more bits of the original data have been flipped. An example of an ECC is a hamming code. In the example of FIG. 2, error coding circuit 204 is positioned at the output interface of IC 102, e.g., between memory controller 112 and I/O pins of IC 102, to generate ECC data 206. In the example of FIG. 2, ECC data 206 is stored in the same memory, e.g., memory device 104-1, as data 118.

Accordingly, via signals 208, memory controller 112 is capable of providing data write commands and data 118 to memory device 104-1. In response to receiving the data write commands and data 118, memory device 104-1 stores data 118 therein. Concurrently, data 118 is provided from memory controller 112 to error coding circuit 204. Error coding circuit 204 generates ECC data 206 and stores ECC data 206 in memory device 104-1 by way of signals 210.

Memory controller 112 is further capable of sending read commands to memory device 104-1 via signals 208 to read data 118, or portions thereof, from memory device 104-1 and read ECC data 206, or portions thereof, from memory device 104-1. Appreciably, corresponding portions of data 118 and ECC data 206 are read back concurrently in response to the read commands. For example, ECCs may be appended to, and stored with, corresponding portions, e.g., words, of data 118. The portions of data 118 read from memory device 104-1 are provided to error correction circuit 202 via signals 212. The portions of ECC data 206 that correspond to the portions of data 118 read from memory device 104-1 are also provided to error correction circuit 202 via signals 212.

In the example of FIG. 2, error correction circuit 202 uses the received ECC data 206 to check the corresponding data 118 for errors and correct any bit errors detected therein. Error correction circuit 202 outputs the resulting data, which may include one or more corrected bits therein, to consumer circuit 108. Consumer circuit 108 is capable of storing the data received from error correction circuit 202 within on-chip memory 110.

In the example of FIG. 2, error correction circuit 202 is capable of generating an output indicating the occurrence of an error. For example, in response to correcting a bit in the received data, error correction circuit 202 is capable of asserting the error signal. In one aspect, the assertion of the error signal may be correlated with the particular read command and address specified by the read command responsible for retrieving the portion of data including the bit error so that the location or address of the bit error within memory device 104-1 is determined.

The example of FIG. 2 may be used to exchange (e.g., read and write) runtime data and/or configuration data between IC 102 and memory device 104-1. In one aspect, error correction circuit 202, error coding circuit 204, consumer circuit 108, on-chip memory 110, and memory controller 112 may be implemented as hardwired circuit blocks. In another aspect, error correction circuit 202 and error coding circuit 204 may be implemented as soft-circuit blocks implemented in programmable circuitry of IC 102 using the multi-stage configuration process described in connection with FIG. 1.

For example, during the first stage of the multi-stage configuration process, error correction circuit 202 and error coding circuit 204 may be implemented by loading the first configuration data. The first configuration data may be limited to implementing only error correction circuit 202 and error coding circuit 204 in IC 102, establishing connections between I/O pins of IC 102 and error correction circuit 202 and error coding circuit 204, establishing connections between consumer circuit 108 and error correction circuit 202, and establishing connections between error coding circuit 204 and memory controller 112. The first configuration data may be small in size thereby limiting the likelihood that an error in the configuration data exists. Other circuitry including user circuits may be implemented by loading other configuration data subsequent to the first configuration data. The subsequently loaded configuration data may be processed through error correction circuit 202 and/or error coding circuit 204.

In one aspect, for example, the first configuration data may not include ECC data as error correction circuit 202 is not yet implemented in IC 102. The further configuration data may have corresponding ECC data since error correction circuit 202 will have been implemented and will be available for processing the further configuration data. In some cases, data 118 (e.g., configuration data) and ECC data 206 may be stored in memory device 104-1 at the time of manufacture of system 100 so that ECC data is available without first having to generate the ECC data using error coding circuit 204.

Figure 3:
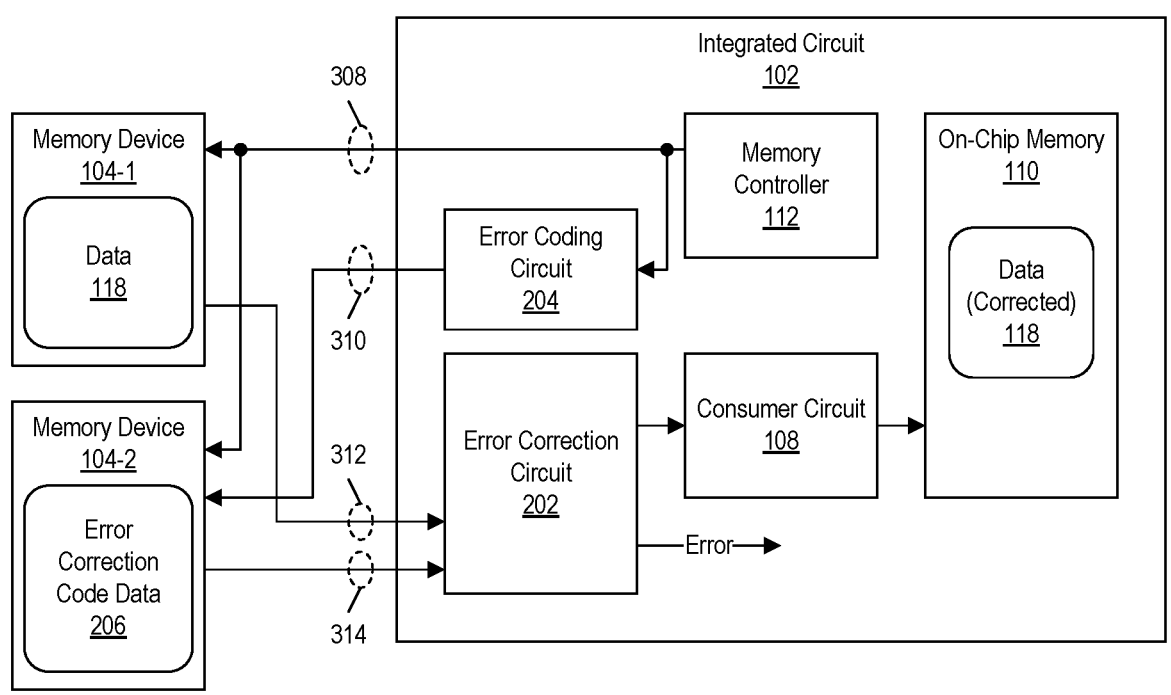
FIG. 3 is another example of an electronic system including error correction circuitry supporting fault tolerant operation.

FIG. 3 is another example of system 100. In the example of FIG. 3, system 100 includes IC 102 and memory devices 104-1 and 104-2. Memory devices 104-1 and 104-2 and IC 102 are separate and distinct from one another. In the example of FIG. 3, memory device 104-1 is used to store data 118. Memory device 104-2 is used to store ECC data 206. Thus, ECC data 206 is stored in a different physical memory device than is data 118 to which ECC data 206 corresponds.

IC 102 of FIG. 3 operates substantially similar the example of FIG. 2 with the exception that data 118 is stored separately from ECC data 206. Accordingly, in the example of FIG. 3, error coding circuit 204 receives data 118 that is output from memory controller 112 for storage in memory device 104-1 and generates error correction code (ECC) data 206 for data 118 stored in memory device 104-2. In the example of FIG. 3, error coding circuit 204 is positioned at the output interface of IC 102, e.g., between memory controller 112 and I/O pins of IC 102, to generate ECC data 206.

Accordingly, via signals 308, memory controller 112 is capable of providing data write commands and data 118 to memory device 104-1. In response to the data write commands and receiving data 118, memory device 104-1 stores data 118 therein. Concurrently, data 118 is provided from memory controller 112 to error coding circuit 204. Error coding circuit 204 generates ECC data 206 and stores ECC data 206 in memory device 104-2 by way of signals 310. Memory device 104-2 receives the same write commands broadcast from memory controller 112 via signals 308 as memory device 104-1. Thus, portions of ECC data 206 written to memory device 104-2 are stored at the same addresses therein as the corresponding portions of data 118 stored in memory device 104-1.

Memory controller 112 is further capable of sending, e.g., broadcasting, read commands to memory devices 104-1 and 104-2 via signals 308 to read portions of data 118 from memory device 104-1 and corresponding portions of ECC data 206 from memory device 104-2. In response to the read commands, the portions of data 118 read from memory device 104-1 are provided to error correction circuit 202 via signals 312. Further, in response to the read commands, the portions of ECC data 206 that correspond to the portions of data 118 read from memory device 104-1 are provided from memory device 104-2 to error correction circuit 202 via signals 314. Appreciably, the portion of data obtained from memory device 104-1 and the corresponding portion of ECC data obtained from memory device 104-2 are located at the same addresses within the respective memories and may be retrieved by a single read command broadcast from memory controller 112.

In the example of FIG. 3, error correction circuit 202 uses the received ECC data 206 to check corresponding data 118 for errors and correct any bit errors detected therein. Error correction circuit 202 outputs the resulting data, which may include one or more corrected bits therein, to consumer circuit 108. Consumer circuit 108 is capable of storing the data received from error correction circuit 202 within on-chip memory 110.

The example implementation of FIG. 3 may be used to exchange (e.g., read and write) runtime data and/or configuration data between IC 102 and memory devices 104-1 and 104-2. In one aspect, error correction circuit 202, error coding circuit 204, consumer circuit 108, on-chip memory 110, and memory controller 112 may be implemented as hardwired circuit blocks. In another aspect, error correction circuit 202 and error coding circuit 204 may be implemented as soft-circuit blocks implemented in programmable circuitry of IC 102 using the multi-stage configuration process described in connection with FIG. 1.

For example, during the first stage of the multi-stage configuration process, error correction circuit 202 and error coding circuit 204 may be implemented by loading the first configuration data. The first configuration data may be limited to implementing only error correction circuit 202 and error coding circuit 204 in IC 102, establishing connections between I/O pins of IC 102 and error correction circuit 202 and error coding circuit 204, establishing connections between consumer circuit 108 and error correction circuit 202, and establishing connections between error coding circuit 204 and memory controller 112. The first configuration data may be small in size thereby limiting the likelihood that an error in the configuration data exists. Other circuitry including user circuits may be implemented by loading other configuration data subsequent to the first configuration data. The subsequently loaded configuration data may be processed through error correction circuit 202 and/or error coding circuit 204.

In the example of FIG. 3, error correction circuit 202 is capable of generating an output indicating the occurrence of an error. For example, in response to correcting a bit in the received data, error correction circuit 202 is capable of asserting the error signal. In one aspect, the assertion of the error signal may be correlated with the particular read command and address specified by the read command responsible for retrieving the portion of data including the bit error so that the location or address of the bit error within memory device 104-1 is determined.

In general, the size of ECC data 206 is smaller in size than data 118. Accordingly, in one aspect, the size of read/write data blocks may be proportionally scaled according to the data size where read/write data blocks of memory device 104-1 are larger than those of memory device 104-2. In that case, address translation may be utilized to read the smaller sized data blocks from memory device 104-2. An address translation circuit may be included external to IC 102 in the signal path to memory device 104-2. Alternatively, an address translation circuit may be implemented in IC 102 via the first configuration data in programmable circuitry. Using address translation, smaller data blocks of ECC data 206 may be read from memory device 104-2 that correspond to the larger data blocks read from memory device 104-1. This allows memory device 104-2 to be smaller, e.g., have less data storage capacity, than memory device 104-1.

In another aspect, memory devices 104-1 and 104-2 may be sized the same and use read/write data blocks of the same size. In that case, ECC data 206 may use only a portion of each data block of memory device 104-2 with the remainder of such data blocks being "don't care" data. With same sized memory devices and data blocks, no address translation is needed. Error coding circuit 204 may output additional "don't care" data to memory device 104-2. Error correction circuit 202 may be configured to ignore the "don't care" data read from memory device 104-2.

The example architecture of FIG. 3 provides various technological advantages. For example, a standard architecture that includes one memory device (e.g., only memory device 104-1) may be augmented to include a second memory device. That is, memory device 104-2 may be added along with versions of error correction circuit 202 and error coding circuit 204 implemented in programmable logic of IC 102. Error correction circuit 202 and error coding circuit 204 may be added through the multi-stage boot process described (e.g., implemented by the first configuration data) or included in full configuration data (e.g., a full configuration bitstream) that configures the entirety of IC 102.

Memory device 104-2, if added to an existing system as described, may be added and connected to IC 102 via a separate and dedicated interface that is independent of the interface used for memory device 104-1. In that case, signal 308 is not connected to memory device 104-2. Still, memory controller 112 may be configured to broadcast the same read commands to both memory devices 104-1, 104-2, albeit over the different interfaces. For example, read and write commands may be provided to memory device 104-2 via signals 310, where signals 310 and 312 are part of the separate and independent interface for memory device 104-2.

Figure 4:
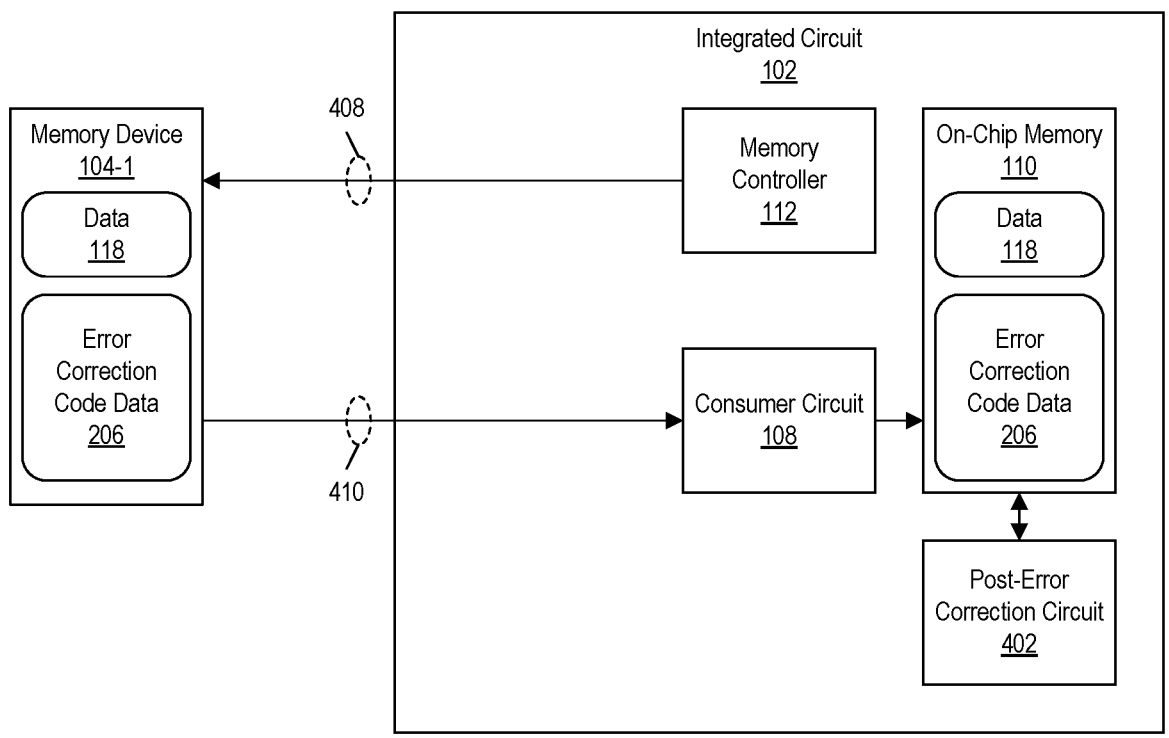
FIG. 4 is another example of an electronic system including error correction circuitry supporting fault tolerant operation.

FIG. 4 is another example of system 100. In the example of FIG. 4, system 100 includes IC 102 and a memory device shown as memory device 104-1 (e.g., one memory device). Memory device 104-1 is separate and distinct from IC 102. In the example of FIG. 4, rather than apply error correction at the interface of IC 102, e.g., after the I/O pins of IC 102 and prior to the data reaching consumer circuit 108, error correction is performed as post loading into on-chip memory 110 by post-error correction circuit 402.

In the example of FIG. 4, signals 408 convey commands and data to be written to memory device 104 (e.g., both data 118 and ECC data 206). Accordingly, memory controller 112 is capable of sending write commands to write data 118 and ECC data 206 to memory device 104-1 via signals 408. Memory controller 112 may send read commands over signals 408 to read both data 118 and ECC data 206 from memory device 104-1 over signals 410. Consumer circuit 108 is capable of storing both data 118 and ECC data 206 within on-chip memory 110.

Subsequent to the loading of data 118 and ECC data 206 into on-chip memory 110, post-error correction circuit 402 is capable of reading data 118 and ECC data 206 from on-chip memory 110 and comparing portions of data 118 with corresponding portions of ECC data 206. Post-error correction circuit 402 corrects any bit error detected by virtue of the comparing within on-chip memory 110. That is, post-error correction circuit 402 corrects bit errors in place in on-chip memory 110.

In one aspect, post-error correction circuit 402 begins operating once data 118 and ECC data 206 are fully loaded into on-chip memory 110. In another aspect, post-error correction circuit 402 is capable of checking and correcting data 118 as such data is written. Further, post-error correction circuit 402 is capable of continually checking data 118 as new and/or modified versions of data 118 and corresponding ECC data 206 are written to on-chip memory 110. In an example implementation, post-error correction circuit 402 is capable of operating continually in real time to check data 118 stored in on-chip memory 110 with respect to corresponding ECC data 206 to correct errors in real time. Thus, errors found in data 118 stored in on-chip memory 110 may be corrected continually and as different data (e.g., new and/or modified data) is added to on-chip memory 110. Accordingly, bit errors in data 118, as stored in memory device 104-1, that may be loaded into on-chip memory 110, may be corrected in on-chip memory 110 by post-error correction circuit 402 using ECC data 206. The example of FIG. 4 does not require any changes to the external memory (e.g., memory device 104-1).

The example implementation of FIG. 4 may be used to exchange (e.g., read and write) runtime data and/or configuration data between IC 102 and memory device 104-1. In one aspect, post-error correction circuit 402, consumer circuit 108, on-chip memory 110, and memory controller 112 may be implemented as hardwired circuit blocks. In another aspect, post-error correction circuit 402 may be implemented as a soft-circuit block implemented in programmable circuitry of IC 102 using the multi-stage configuration process described in connection with FIG. 1.

For example, during the first stage of the multi-stage configuration process, post-error correction circuit 402 may be implemented by loading the first configuration data. The first configuration data may be limited to implementing only post-error correction circuit 402 in IC 102 and establishing connections between post-error correction circuit 402 and on-chip memory 110. The first configuration data may be small in size thereby limiting the likelihood that an error in the configuration data exists. Other circuitry including user circuits may be implemented by loading other configuration data subsequent to the first configuration data. Post-error correction circuit 402 may then process data stored in on-chip memory 110.

In another aspect, the post-error correction circuit is capable of continually scanning, e.g., reading, the data and the error correction codes in the on-chip memory 110 in real time during operation of the integrated circuit to detect and correct errors therein. In other example implementations, the scanning may be performed from time-to-time (e.g., scheduled), or performed responsive to particular events such as the writing of new and/or modified data to on-chip memory 110. Further, such scanning may be performed across the entirety of on-chip memory 110 or may be limited in scope, for example, to only those portions of on-chip memory 110 that were written with new and/or modified data.

In one aspect, an implementation of post-error correction circuit 402 implemented in programmable circuitry is configured to avoid, or omit, scanning of configuration memory locations that implement post-error correction circuit 402 itself. For example, post-error correction circuit 402, if implemented in programmable circuitry, may omit scanning lookup-table RAM (LUTRAM) that forms part of post-error correction circuit 402 as such memory may toggle during operation of post-error correction circuit 402 leading to a situation where scanning of such portions of on-chip memory 110 may cause data corruption. In some example implementations, post error correction circuit 402 may be implemented without using LUTRAM so as to avoid the issue altogether.

In an example implementation, to avoid conflict between running programmable circuitry and the scanning and correction procedure performed by post-error correction circuit 402, user-circuitry (e.g., circuitry implemented in IC 102 by virtue of loading configuration data into on-chip memory 110 other than post-error correction circuit 402 if also implemented in programmable circuitry) may be placed in a paused state while the scanning is performed. For example, the user circuitry may be placed in a state where clock buffers of the user circuitry are in a disabled state to prevent the user circuitry from running during the initial scan/correction procedure. Once the scanning and correction procedure is complete, the user circuitry may be enabled by enabling the clock buffers of the user circuitry thereby allowing the user circuitry to operate.

The example implementations described within this disclosure in connection with FIGS. 1-4 are capable of correcting data once the error correction circuitry is implemented and/or operational. The correction may be performed within IC 102 itself. Thus, despite receiving data from an external memory device that includes one or more bit errors, the error correction circuitry may correct such errors once the data is received within IC 102. In one or more example implementations, bit errors may be corrected in place prior to first use of the data whether as runtime data or as configuration data. The inventive arrangements relax the requirement that error-free data be provided to IC 102.

Figure 5:
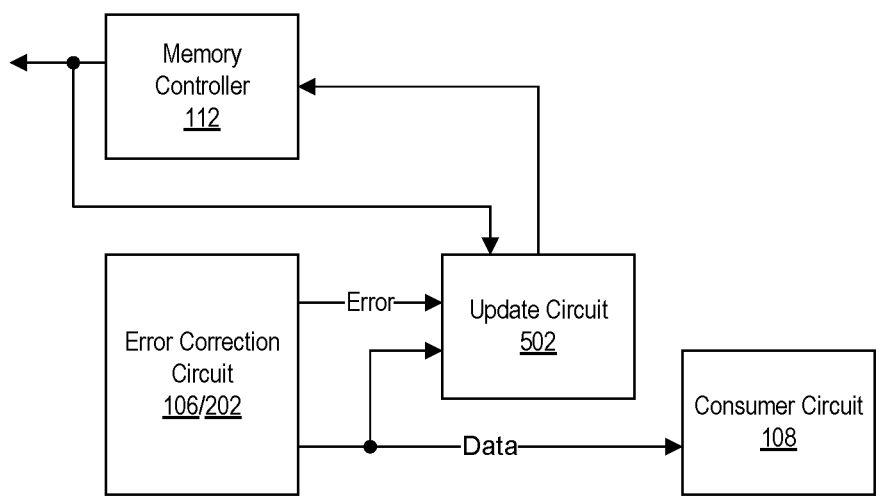
FIG. 5 is an example of an electronic system including update circuitry supporting error correction.

FIG. 5 is an example of an electronic system including update circuitry supporting error correction. In the example of FIG. 5, an update circuit 502 is included within system 100. For purposes of illustration, certain elements of system 100 have been omitted. The example of FIG. 5 may be incorporated into the example systems described in connection with FIGS. 1, 2, and 3. Accordingly, update circuit 502 is operable with error correction circuit 106 and/or error correction circuit 202.

In the example, update circuit 502 receives the error signal from error correction circuit 106/202. Further, update circuit 502 is capable of receiving commands from memory controller 112. As such, update circuit 502 is capable of determining the particular read command, and address specified by the read command, that returned the data including the detected error. Update circuit 502 is capable of receiving the corrected data from error correction circuit 106/202 and providing the corrected data and address of memory device(s) 104 to which the corrected data is to be written to memory controller 112. Memory controller 112 is capable of writing the corrected data to the memory device(s) 104.

The example of FIG. 5, in facilitating correction of corrupted bits in the source memory, avoids the accumulation of bit errors in the source memory that, if left unchecked over time, may overwhelm error correction capabilities of the example circuit architectures described herein.

Figure 6:
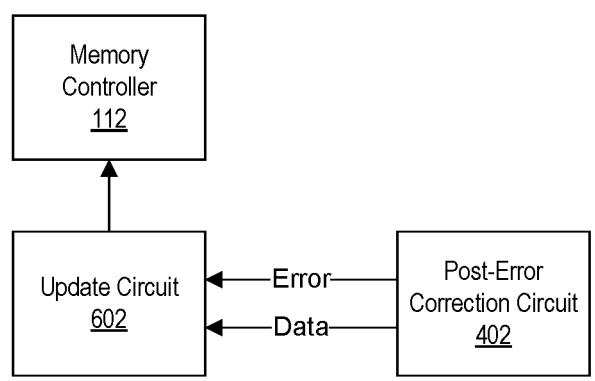
FIG. 6 is another example of an electronic system including update circuitry supporting error correction.

FIG. 6 is another example of an electronic system including update circuitry supporting error correction. In the example of FIG. 6, update circuit 602 is included within system 100. For purposes of illustration, certain elements of system 100 have been omitted. The example of FIG. 6 may be incorporated into the example system described in connection with FIG. 4. Accordingly, update circuit 602 is operable with post-error correction circuit 402.

In the example, update circuit 602 receives the error signal from post-error correction circuit 402. In the example of FIG. 6, the error signal may indicate the particular region of data from on-chip memory 110 in which the error was detected and/or corrected. Update circuit 602 is capable of mapping the location of the detected error in on-chip memory 110 to a location (e.g., address) in memory device 104-1. Update circuit 602 is capable of receiving the corrected data from post-error correction circuit 402 and providing the corrected data and the address to which the corrected data is to be written in memory device 104-1 (e.g., the mapped address) to memory controller 112. Memory controller 112 is capable of writing the corrected data to memory device 104-1.

Figure 7:
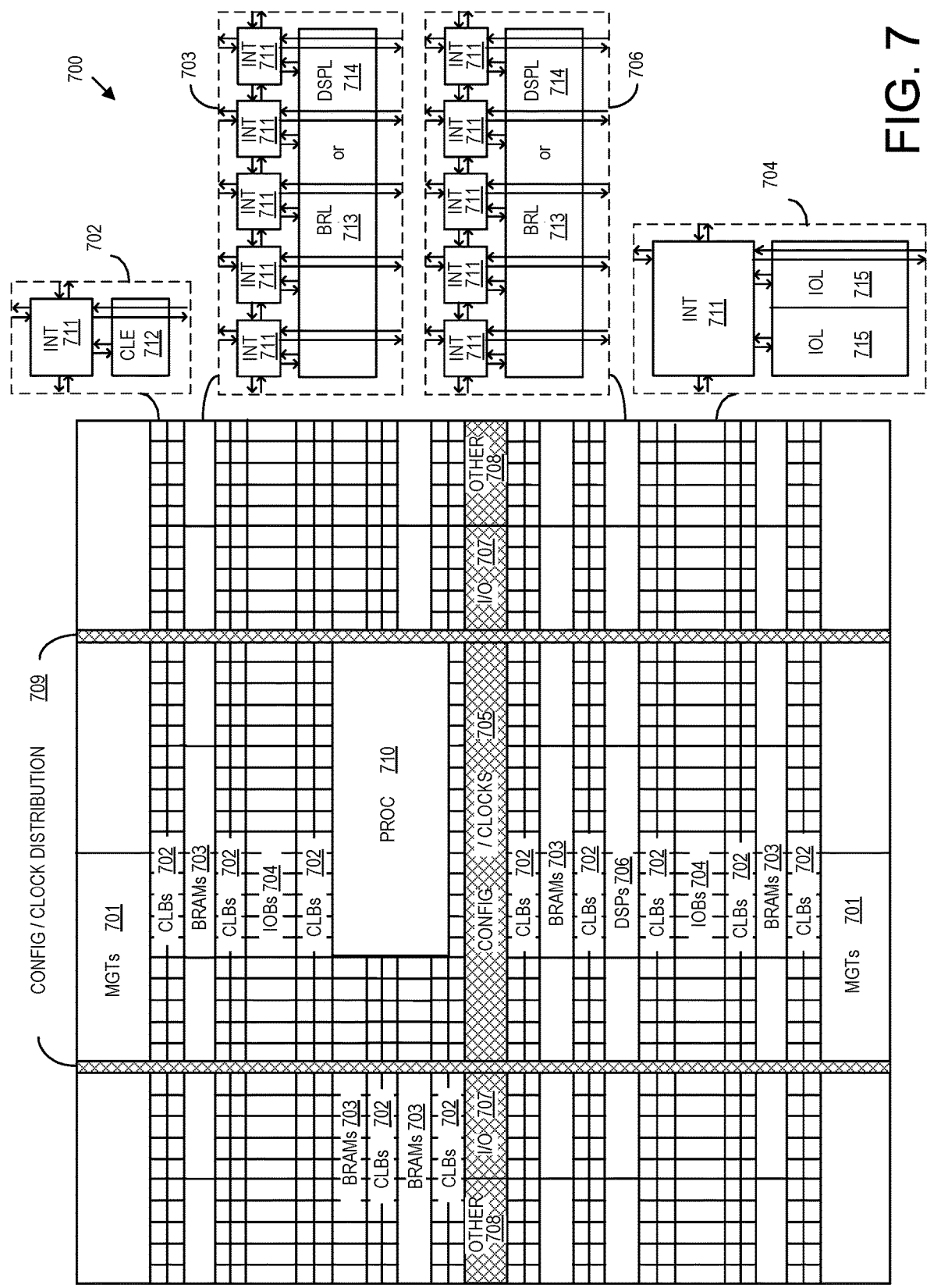
FIG. 7 illustrates an example architecture for an integrated circuit (IC).

FIG. 7 illustrates an example architecture 700 for an IC. In one aspect, architecture 700 may be implemented within a programmable IC. For example, architecture 700 may be used to implement an FPGA. Architecture 700 may also be representative of an SoC type of IC. An SoC may include a processor that executes program code and one or more other circuits. The other circuits may be implemented as hardwired circuitry, programmable circuitry, and/or a combination thereof. The circuits may operate cooperatively with one another and/or with the processor.

As shown, architecture 700 includes several different types of programmable circuit, e.g., logic, blocks. For example, architecture 700 may include a large number of different programmable tiles including multi-gigabit transceivers (MGTs) 701, configurable logic blocks (CLBs) 702, random access memory blocks (BRAMs) 703, input/output blocks (IOBs) 704, configuration and clocking logic (CONFIG/CLOCKS) 705, digital signal processing blocks (DSPs) 706, specialized I/O blocks 707 (e.g., configuration ports and clock ports), and other programmable logic 708 such as digital clock managers, analog-to-digital converters, system monitoring logic, and so forth.

In some ICs, each programmable tile includes a programmable interconnect element (INT) 711 having standardized connections to and from a corresponding INT 711 in each adjacent tile. Therefore, INTs 711, taken together, implement the programmable interconnect structure for the illustrated IC. Each INT 711 also includes the connections to and from the programmable logic element within the same tile, as shown by the examples included at the right of FIG. 7.

For example, a CLB 702 may include a configurable logic element (CLE) 712 that may be programmed to implement user logic plus a single INT 711. A BRAM 703 may include a BRAM logic element (BRL) 713 in addition to one or more INTs 711. Typically, the number of INTs 711 included in a tile depends on the height of the tile. As pictured, a BRAM tile has the same height as five CLBs, but other numbers (e.g., four) also may be used. A DSP tile 706 may include a DSP logic element (DSPL) 714 in addition to an appropriate number of INTs 711. An IOB 704 may include, for example, two instances of an I/O logic element (IOL) 715 in addition to one instance of an INT 711. The actual I/O pads connected to IOL 715 may not be confined to the area of IOL 715.

In the example pictured in FIG. 7, an area near the center of the die, e.g., formed of regions 705, 707, and 708, may be used for configuration, clock, and other control logic. Areas 709 extending from the area near the center of the die may be used to distribute the clocks and configuration signals across the breadth of the programmable IC.

Some ICs utilizing the architecture illustrated in FIG. 7 include additional logic blocks that disrupt the regular columnar structure making up a large part of the IC. The additional logic blocks may be programmable blocks and/or dedicated circuitry. For example, a processor block depicted as PROC 710 spans several columns of CLBs and BRAMs.

In one aspect, PROC 710 may be implemented as dedicated circuitry, e.g., as a hardwired processor, that is fabricated as part of the die that implements the programmable circuitry of the IC. PROC 710 may represent any of a variety of different processor types and/or systems ranging in complexity from an individual processor, e.g., a single core capable of executing program code, to an entire processor system having one or more cores, modules, co-processors, interfaces, or the like.

In another aspect, PROC 710 may be omitted from architecture 700 and replaced with one or more of the other varieties of the programmable blocks described. Further, such blocks may be utilized to form a "soft processor" in that the various blocks of programmable circuitry may be used to form a processor that can execute program code as is the case with PROC 710.

The phrase "programmable circuitry" refers to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, circuit blocks shown in FIG. 7 that are external to PROC 710 such as CLBs 702 and BRAMs 703 are considered programmable circuitry of the IC.

In general, the functionality of programmable circuitry is not established until configuration data is loaded into configuration memory (not shown) of the IC. A set of configuration bits may be used to program programmable circuitry of an IC. The configuration bit(s) typically are referred to as a "configuration bitstream." In general, programmable circuitry is not operational or functional without first loading a configuration bitstream into the IC. The configuration bitstream effectively implements a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 710.

In some instances, hardwired circuitry may have one or more operational modes that can be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

In the case of an SoC, the configuration bitstream may specify the circuitry that is to be implemented within the programmable circuitry and the program code that is to be executed by PROC 710 or a soft processor. In some cases, architecture 700 includes a dedicated configuration processor that loads the configuration bitstream to the appropriate configuration memory and/or processor memory. The dedicated configuration processor does not execute user-specified program code. In other cases, architecture 700 may utilize PROC 710 to receive the configuration bitstream, load the configuration bitstream into appropriate configuration memory, and/or extract program code for execution.

FIG. 7 is intended to illustrate an example architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the right of FIG. 7 are purely illustrative. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 710 within the IC are for purposes of illustration only and are not intended as limitations.

The inventive arrangements may be used with an IC having an architecture the same as or similar to that of FIG. 7. Still, the inventive arrangements may also be used with the other types of ICs described herein for purposes runtime operation and/or configuration including configuration of components that are hardwired circuit blocks.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

For purposes of explanation, specific nomenclature is set forth to provide a thorough understanding of the various inventive concepts disclosed herein. As defined herein, the singular forms "a," "an," and "the" are intended to include the plural forms as well, unless the context clearly indicates otherwise. As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention. The term "user" refers to a human being unless the context indicates otherwise. As defined herein, the term "real time" means a level of processing responsiveness that a user or system senses as sufficiently immediate for a particular process or determination to be made, or that enables the processor to keep up with some external process.

The terms first, second, etc. may be used herein to describe various elements. These elements should not be limited by these terms, as these terms are only used to distinguish one element from another unless stated otherwise or the context clearly indicates otherwise.

The block diagrams in the figures illustrate the architecture, functionality, and operation of possible implementations of systems and methods according to various aspects of the inventive arrangements. The corresponding structures, materials, acts, and equivalents of all means or step plus function elements that may be found in the claims below are intended to include any structure, material, or act for performing the function in combination with other claimed elements as specifically claimed.

A system can include a plurality of memory devices, wherein the plurality of memory devices includes at least three memory devices. The system can include an IC. The IC can include a memory controller coupled to each of the plurality of memory devices in parallel, wherein the memory controller is configured to broadcast a read command to each of the plurality of memory devices. The IC can include an error correction circuit coupled to each of the plurality of memory devices, wherein the error correction circuit is configured to compare data bits received from the plurality of memory devices responsive to the read command and output data bits corresponding to a majority of the data bits received from the plurality of memory devices. The IC can include a consumer circuit coupled to the error correction circuit, wherein the consumer circuit receives the data bits output from the error correction circuit.

The foregoing and other implementations can each optionally include one or more of the following features, alone or in combination. Some example implementations include all the following features in combination.

In another aspect, the consumer circuit includes a configuration access port coupled to the error correction circuit. The IC can include a configuration memory coupled to the configuration access port. The configuration access port is capable of writing the data bits output from the error correction circuit to the configuration memory.

In another aspect, the error correction circuit is implemented as a hardwired circuit block of the IC.

In another aspect, the error correction circuit is implemented using programmable circuitry of the IC. For example, the error correction circuit may be implemented by loading first configuration data into the IC. The first configuration data may be loaded during a first stage of a multi-stage configuration process for the IC. Further configuration data loaded subsequent to the first configuration data may be processed using the error correction circuit implemented in the programmable circuitry by the first configuration data.

In another aspect, the memory controller is configured to broadcast read commands to each of the plurality of memory devices concurrently.

In another aspect, the memory controller is configured to broadcast write commands and data to each of the plurality of memory devices concurrently.

In another aspect, in response to detecting a bit error, the error correction circuit generates a signal indicating the bit error.

In another aspect, the system can include an update circuit coupled to the memory controller, wherein the update circuit, in response to the signal indicating the bit error, initiates a write operation that overwrites a portion of at least one of the plurality of memory devices that includes the bit error with a corrected version of the data.

A system can include one or more memory devices and an IC. The IC can include a memory controller coupled to the one or more memory devices. The IC can include an error coding circuit coupled to the memory controller and the one or more memory devices. The error coding circuit can be configured to generate error correction codes for data written to the one or more memory devices by the memory controller and provide the error correction codes to the one or more memory devices for storage therein with the data. The data and the error correction codes are stored in the one or more memory devices responsive to write commands from the memory controller. The IC can include an error correction circuit coupled to the one or more memory devices, wherein the error correction circuit is configured to receive data and corresponding error correction codes read from the one or more memory devices. The data and the error correction codes read from the one or more memory devices are received in response to read commands provided to the one or more memory devices from the memory controller. The error correction circuit can be configured to detect and correct errors in the data read from the one or more memory devices based on the error correction codes read from the one or more memory devices. The IC can include a consumer circuit coupled to the error correction circuit, wherein the consumer circuit receives corrected data output from the error correction circuit.

The foregoing and other implementations can each optionally include one or more of the following features, alone or in combination. Some example implementations include all the following features in combination.

In another aspect, the consumer circuit includes a configuration access port coupled to the error correction circuit. The IC includes a configuration memory coupled to the configuration access port. The configuration access port writes the corrected data to the configuration memory.

In another aspect, the error coding circuit and the error correction circuit are implemented as hardwired circuit blocks of the IC.

In another aspect, the error coding circuit and the error correction circuit are implemented using programmable circuitry of the IC. For example, the error coding circuit and the error correction circuit may be implemented by loading first configuration data into the IC. The first configuration data is loaded during a first stage of a multi-stage configuration process for the IC. Further configuration data loaded subsequent to the first configuration data is processed using the error correction circuit implemented in the programmable circuitry by the first configuration data.

A system can include a memory device configured to store data and error correction codes for the data. The system also includes an IC. The IC can include a memory controller coupled to the memory device and an on-chip memory. The IC can include a consumer circuit coupled to the memory device, wherein the consumer circuit is configured to receive, from the memory device, the data and the error correction codes corresponding to the data responsive to read commands provided to the memory device from the memory controller. The consumer circuit stores the data and the error correction codes in the on-chip memory. The IC can include a post-error correction circuit configured to scan the data and the error correction codes stored in the on-chip memory and correct bit errors in the data stored in the on-chip memory based on the error correction codes stored in the on-chip memory.

The foregoing and other implementations can each optionally include one or more of the following features, alone or in combination. Some example implementations include all the following features in combination.

In another aspect, the post-error correction circuit is configured to continually scan the data and the error correction codes in the on-chip memory in real time during operation of the integrated circuit.

In another aspect, the consumer circuit includes a configuration access port coupled to the post-error correction circuit.

In another aspect, the post-error correction circuit is implemented as a hardwired circuit block of the IC.

In another aspect, the post-error correction circuit is implemented using programmable circuitry of the IC. For example, the post-error correction circuit is implemented by loading first configuration data into the IC. The first configuration data is loaded during a first stage of a multi-stage configuration process for the IC. Configuration data loaded subsequent to the first configuration data is processed using the post-error correction circuit implemented in the programmable circuitry by the first configuration data.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A system, comprising:
a plurality of memory devices, wherein the plurality of memory devices includes at least three memory devices;
an integrated circuit including:
a memory controller coupled to each of the plurality of memory devices in parallel, wherein the memory controller is hardwired and configured to communicate with the plurality of memory devices; and
programmable circuitry;
wherein, during a first stage of a multi-stage boot process, the memory controller loads a first configuration data into the integrated circuit from a selected one of the plurality of memory devices, wherein the first configuration data implements an error correction circuit in the programmable circuitry;
wherein, during a second stage of the multi-stage boot process, the memory controller broadcasts a read command to each of the plurality of memory devices to load a second configuration data, from each of the plurality of memory devices, into the integrated circuit, the second configuration data specifying user circuitry; and
wherein the second configuration data is processed through the error correction circuit, wherein the error correction circuit is configured to compare data bits of the second configuration data received from the plurality of memory devices responsive to the read command and output data bits corresponding to a majority of the data bits received from the plurality of memory devices to a configuration access port configured to write the output data bits to configuration memory of the integrated circuit implementing the user circuitry.

2. The system of claim 1, wherein the memory controller is configured to broadcast read commands to each of the plurality of memory devices concurrently.

3. The system of claim 1, wherein the memory controller is configured to broadcast write commands and data to each of the plurality of memory devices concurrently.

4. The system of claim 1, wherein
in response to detecting a bit error, the error correction circuit generates a signal indicating the bit error.

5. The system of claim 4, further comprising:
an update circuit coupled to the memory controller, wherein the update circuit, in response to the signal indicating the bit error, initiates a write operation that overwrites a portion of at least one of the plurality of memory devices that includes the bit error with a corrected version of the data.

6. A system, comprising:
one or more memory devices;
an integrated circuit including:
a memory controller coupled to the one or more memory devices; and
programmable circuitry;
wherein, during a first stage of a multi-stage boot process, the memory controller loads a first configuration data into the integrated circuit from the one or more memory devices, wherein the first configuration data implements an error correction circuit and an error coding circuit in the programmable circuitry;
wherein the error coding circuit generates error correction codes for a second configuration data read from the one or more memories by the memory controller and, via the memory controller writes the error correction codes to the one or more memory devices;
wherein, during a second stage of the multi-stage boot process, the memory controller loads the second configuration data and the error correction codes into the integrated circuit from the one or more memory devices, the second configuration data specifying user circuitry; and
wherein the second configuration data and the error correction codes are processed through the error correction circuit, wherein the error correction circuit is configured to detect and correct errors in the second configuration data based on the error correction codes and provide the processed second configuration data to a configuration access port configured to write the processed second configuration data to configuration memory of the integrated circuit implementing user circuitry.

7. A system, comprising:
a memory device configured to store configuration data and error correction codes for the configuration data, wherein the configuration data specifies user circuitry;
an integrated circuit including:
a memory controller coupled to the memory device;
programmable circuitry;
an on-chip memory, wherein the on-chip memory is a configuration memory controlling implementation of circuits in the programmable circuitry;
a consumer circuit coupled to the memory device, wherein the consumer circuit is configured to receive, from the memory device, the configuration data and the error correction codes corresponding to the configuration data responsive to read commands provided to the memory device from the memory controller, and wherein the consumer circuit stores the configuration data and the error correction codes in the on-chip memory, the configuration data implementing the user circuitry in the programmable circuitry; and
a post-error correction circuit configured to scan the configuration data and the error correction codes stored in the on-chip memory and correct bit errors in the configuration data stored in the on-chip memory based on the error correction codes stored in the on-chip memory.

8. The system of claim 7, wherein
the post-error correction circuit is configured to continually scan the configuration data and the error correction codes in the on-chip memory in real time during operation of the integrated circuit.

9. The system of claim 7, wherein the consumer circuit comprises:
   a configuration access port coupled to the post-error correction circuit.

10. The system of claim 7, wherein the post-error correction circuit is implemented as a hardwired circuit block of the integrated circuit.

11. The system of claim 5, wherein
   during a first stage of a multi-stage boot process, the memory controller loads an initial configuration data into the integrated circuit from the memory device, wherein the initial configuration data implements the post error correction circuit in the programmable circuitry; and
   during a second stage of the multi-stage boot process, the memory controller loads the configuration data specifying the user circuitry and the error codes into the integrated circuit.

* * * * *